United States Patent
Arlitt et al.

(10) Patent No.: US 8,956,114 B2
(45) Date of Patent: Feb. 17, 2015

(54) UNDERWATER POWER PLANT WITH PASSIVE CONTROL

(75) Inventors: Raphael Arlitt, Ulm (DE); Ralf Starzmann, Sohnstetten (DE); Frank Biskup, Schwabisch Gmund (DE)

(73) Assignee: Voith Patent GmbH, Heidenheim (DE)

( * ) Notice: Subject to any disclaimer, the term of this patent is extended or adjusted under 35 U.S.C. 154(b) by 629 days.

(21) Appl. No.: 12/586,905

(22) Filed: Sep. 28, 2009

(65) Prior Publication Data

US 2010/0104435 A1 Apr. 29, 2010

(30) Foreign Application Priority Data

Oct. 15, 2008 (DE) .......... 10 2008 051 370

(51) Int. Cl.
- F03B 3/14 (2006.01)
- F03B 13/26 (2006.01)
- F03B 17/06 (2006.01)

(52) U.S. Cl.
CPC ............. *F03B 13/264* (2013.01); *F03B 17/061* (2013.01); *F05B 2210/404* (2013.01); *F05B 2240/97* (2013.01); *F05B 2260/506* (2013.01); *F05B 2260/71* (2013.01); *F05B 2260/74* (2013.01); *F05B 2260/75* (2013.01); *F05B 2260/77* (2013.01); *F05B 2260/78* (2013.01); *F05B 2260/79* (2013.01); *F05B 2270/402* (2013.01); *F05B 2270/508* (2013.01); *Y02E 10/28* (2013.01); *Y02E 10/38* (2013.01); *Y02E 10/721* (2013.01)
USPC .............................. 416/23; 416/144; 416/167

(58) Field of Classification Search
USPC ....... 416/23, 144, 131, 132 A, 139, 140, 167, 416/246
See application file for complete search history.

(56) References Cited

U.S. PATENT DOCUMENTS

| | | | | | |
|---|---|---|---|---|---|
| 910,899 | A | * | 1/1909 | Bowers | 416/167 |
| 1,962,382 | A | * | 6/1934 | Biggs | 415/129 |
| 2,283,774 | A | * | 5/1942 | Thompson | 416/140 |
| 3,138,136 | A | * | 6/1964 | Nichols | 416/163 |
| 3,275,082 | A | * | 9/1966 | Stark | 416/234 |
| 4,366,387 | A | * | 12/1982 | Carter et al. | 290/55 |
| 4,971,641 | A | * | 11/1990 | Nelson et al. | 156/64 |
| 5,249,925 | A | * | 10/1993 | Guimbal et al. | 416/134 A |
| 6,116,856 | A | | 9/2000 | Karadgy | |
| 6,652,221 | B1 | * | 11/2003 | Praenkel | 415/3.1 |

FOREIGN PATENT DOCUMENTS

| | | |
|---|---|---|
| DE | 27 39 297 | 3/1978 |
| DE | 10021430 A1 | 1/2002 |
| FR | 1149452 A | 12/1957 |

* cited by examiner

Primary Examiner — Ned Landrum
Assistant Examiner — Woody A Lee, Jr.
(74) Attorney, Agent, or Firm — Farjami & Farjami LLP

(57) ABSTRACT

There is provided a free standing tidal power plant without a dam structure set to take up kinetic energy from a water flow. The tidal power plant includes a propeller-shaped water turbine in horizontal rotor configuration with rotor blades, the rotor blades having bidirectional profiles, wherein the rotor blades are fastened to a revolving unit, which defines a rotational plane, and an electric generator at least indirectly driven by the water turbine. Each rotor blade is associated with a first swivel axis and a second swivel axis, the first axis and the second swivel axis extending substantially along a longitudinal axes of a first coupling element and a second coupling element, respectively. The revolving unit includes a planar guide region having a sliding apparatus, a first guide groove and a second guide groove, the sliding apparatus connected to the rotor blade to transmit rotor blade forces.

8 Claims, 8 Drawing Sheets

UNDERWATER POWER PLANT WITH PASSIVE CONTROL

This is a U.S. national phase application which is based on, and claims priority from foreign application Serial No. DE 102008051370.9-15, filed on Oct. 15, 2008 in Germany.

FIELD OF THE INVENTION

The invention relates to an underwater power plant with passive power control, especially a tidal power plant, having a propeller-shaped water turbine in horizontal rotor configuration.

BACKGROUND

Underwater power plants which absorb kinetic energy in a free-standing manner without any dam structure from a water flow are especially suitable for power generation from an ocean current, preferably a tidal current. An advantageous embodiment for underwater power plants comprises propeller-shaped water turbines with a plurality of rotor blades-which are fixed to a revolving unit.

Such a water turbine can be fastened to a support structure via a machine gondola in which an electric generator is typically accommodated, which support structure is arranged to be fixed to foundations in the floor of the water body or to be floating. For the economic design of generic underwater power plants, especially for power generation from a tidal current, the mean flow speeds that occur over the course of the year are typically used as a basis. However, in the case of a location of the plant in the sea, inflow speeds may occur in certain cases at least over short periods of time which lie above the chosen plant configuration. Such extreme situations occur especially under stormy conditions, for which the wind and waves run in the direction of the tidal current. The mechanical power absorbed by the water turbine from the flow needs to be limited in such cases of stress.

A known form of power limitation provides the use of an active blade angle adjusting device. This allows choosing the angle of attack of the rotor blades of the driving flow in such a way that a desired power curve is obtained. In extreme situations, the rotor blades are guided in the direction of the feathered pitch position and the power intake is thus limited. Accordingly, the components downstream of the water turbine are protected in the drive train against overloading. The disadvantageous aspect in this approach is the constructional effort required for arranging such a blade angle adjusting device. Moreover, additional movable components are necessary in the revolving unit which lead to an increased failure risk and consequently require regular maintenance.

In order to achieve a sturdy configuration of the system that requires as little maintenance as possible, speed guidance by means of the supporting effect through the electric generator in the drive train can be caused as an alternative measure for power limitation. The generator and possibly further braking apparatuses will reduce the speed of the rotor in the case of an overload in order to guide the same away from power optimum. This reduction in speed can go so far that a stall occurs at the profile of the rotor blades, so that power intake is reduced efficiently. The disadvantageous aspect in this approach is that mechanical loads occurring under the conditions of a stall are high as a result of the occurring blade excitations and require a respective configuration of the structural stiffness of the rotor blades. A high constructional effort is the result of this requirement placed on strength and makes the water turbine heavier.

When the above speed guidance of the water turbine for power limitation is arranged in such a way that in the case of overload an increase of speed to a rotational speed above the best point is allowed, it is possible to prevent stalling. However, high forces will act on the water turbine in the range of high rotational speeds. The increasing centrifugal moments need to be taken into account for the design of the plant especially in the range of high speeds.

SUMMARY OF THE INVENTION

The invention is based on the object of providing a power limitation in the case of overloading which is simple from a constructional standpoint and for which it is possible to omit an associated open-loop and closed-loop control device. Moreover, the power limitation shall be arranged in such a way that the impact of excessively high loads on the rotor can be excluded as a result of the construction.

The inventors have recognized for the solution of the above object that a sturdy and efficient power limitation is provided by means of self-adjustment of the rotor blades for a water turbine in horizontal-rotor design. For this purpose, a water turbine arranged in the manner of a propeller with a plurality of rotor blades fastened to a revolving unit is assumed. Each rotor blade is associated with a swivel axis which extends substantially along the rotor blades. The swivel axis is displaced towards the inflow profile nose in relation to the hydrodynamic center.

The respective rotor blade can rotate about the swivel axis either at the base point, which means the fastening point to the revolving unit, and/or the rotor blade performs a torsion about the swivel axis as a result of the load caused by the hydrodynamic forces. The torsion can extend over the entire blade or be limited to a portion of the longitudinal extension, which means over a section of the swivel axis.

The embodiment alternatives of a rotatably arranged fastening on the one hand and an elastic arrangement of the rotor blade in relation to a torsion on the other hand lead to an upwardly pivoting moment in the case of a respective choice of the swivel axis relative to the threading line of the hydrodynamic centers of the profile sections with the swivel axis as the surface normal. This shall be understood as a moment that twists the rotor blade in the direction of feathered pitch position or causes a torsion facing in this direction.

The centrifugal forces occurring during the revolving of the rotor blade act against the movement towards the feathered pitch position, so that in every operational situation there is a balance in moments between the centrifugal moments which generate a moment guiding the blade back and the upwardly pivoting, hydrodynamic moment. Additional elastic restoring forces must be considered in the case of an elastic deformation of the rotor blades or components attached thereto. They can arise during a torsion in the blade per se or a device for generating a restoring force is included in addition in the fastening of the rotor blade in the revolving unit.

In the event that a device for generating a restoring force is integrated in the fastening of the rotor blade in the revolving unit which elastically counteracts a rotation of the rotor blade about the swivel axis in the direction of the feathered pitch position, the rotor blades are automatically returned to the rotor plane after the fading of the overload case. The same applies when the upwardly swiveling movement in the direction of the feathered pitch position is based substantially on torsion of the rotor blades.

If such elastic restoring forces are missing for an arrangement with rotor blades which are fastened rotatably on the revolving unit, the return from the feathered pitch position must be caused by the effect of the centrifugal moments. For this purpose, the water turbine is accelerated either by means of motive operation of the electric generator of the underwater power plant to such an extent until return swiveling occurs or there is also a minimum driving moment in the feathered pitch position at inflow which is sufficient to operate the plant, so that automatic run-up to a speed threshold occurs for which the centrifugal moments exceed the hydrodynamic moments with upwardly swiveling effect and a return to the position for normal operation occurs.

According to a further development of the invention, the passive power control in accordance with the invention is used for an underwater power plant with bidirectional inflow. Profiles with bidirectional inflow for the rotor blades are advantageous especially for tidal power plants because in such a construction a cyclic change of the inflow direction does not require any rotation of the rotor blades about their longitudinal axis or a rotation of the entire plant about the vertical axis. For this purpose, it is possible to use hydrodynamic symmetrically arranged profiles of a lens-shaped configuration or point-symmetrical profiles with an S-twist. When the passive rotor blade adjustment is combined with inflow capability on both sides, a plant design is obtained which is especially simplified in a constructional respect concerning open-loop and closed-loop control: The requirements placed on the electronic control system which is necessary for monitoring the plant are accordingly reduced, so that an underwater power plant of high sturdiness is obtained. The invention is explained below in closer detail by reference to embodiments in conjunction with the drawings, which show in detail:

DESCRIPTION OF THE PREFERRED EMBODIMENTS

Figure 1:
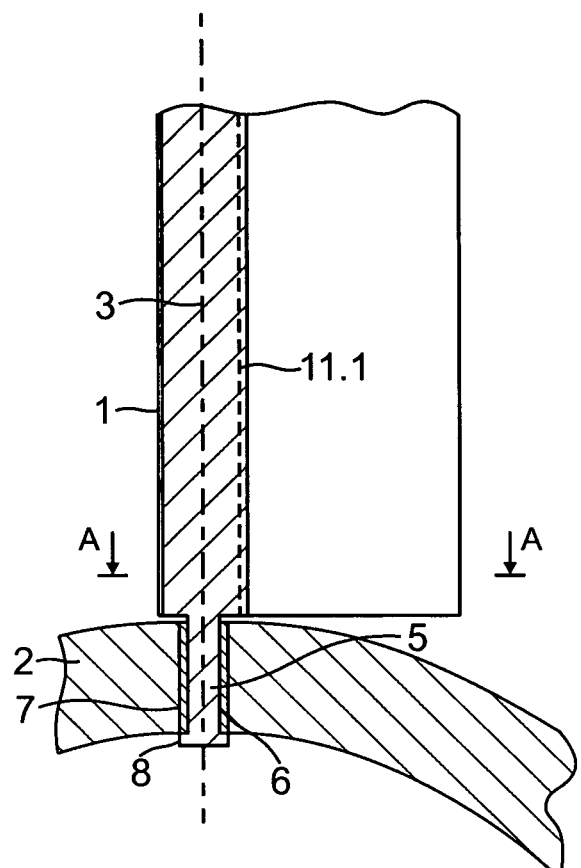
FIG. 1 shows a rotor blade adjustment device in accordance with the invention.

FIG. 1 shows a longitudinal sectional view of a partial section of a rotor blade 1 with passive rotor blade adjustment. The rotor blade 1 is linked in a rotatable manner about a swivel axis 3 on a revolving unit 2 which is arranged in a hub-like manner in this case. An axial pin 5 is provided for this purpose which is inserted in a receptacle 6 in the revolving unit 2. The receptacle 6 is associated with a bearing 7 which can be arranged as a water-lubricated slide bearing and which allows the axial pin 5 to perform a rotational movement. The bearing 7 must absorb the forces introduced by the rotor blade into the revolving unit 2. In addition, a radial securing means 8 is provided on the axial pin 5 which grasps behind a thrust bearing on the revolving unit 2 in order to secure the rotor blade 1 in the radial direction.

Figure 2:
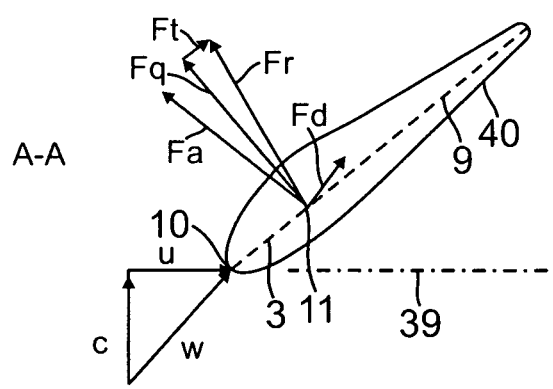
FIG. 2 explains the inflow conditions and the resulting force action for a unidirectional rotor blade profile.

As a result of the rotatable linkage of rotor blade 1 as shown in FIG. 1 to the revolving unit 2, the blade angle of the rotor blade 1 relative to the rotational plane 39 will set during the operation of the plant according to the balance of the acting moments. One of the acting moments is obtained by the hydrodynamic forces acting upon the rotor blade 1. This is shown in FIG. 2, with a unidirectional profile of a rotor blade 1 being outlined according to the section A-A of FIG. 1. The illustrated profile is schematically simplified, with profiles similar to those of hydrofoils being generally used for underwater power plants of this kind.

FIG. 2 shows the driving flow c and the negative circumferential speed u of the rotor blade, which add up as vectors to the effective inflow w. It meets the profile nose 10 and generates a force effect on the profile which acts upon the hydrodynamic center 11. It is composed of lift $F_a$ and the drag $F_d$ which result in the hydrodynamic force $F_r$ when added up as vectors. In the present case, the hydrodynamic center 11 lies approximately at a quarter of the length of the profile chord 9. The resulting hydrodynamic force $F_r$ which acts upon the hydrodynamic center 11 can be broken down into two components. This is the tangential force $F_t$ on the one hand which extends parallel to the profile chord 9. On the other hand, a transversal force $F_q$ is obtained with an orientation perpendicular to the profile chord 9.

Figure 3:
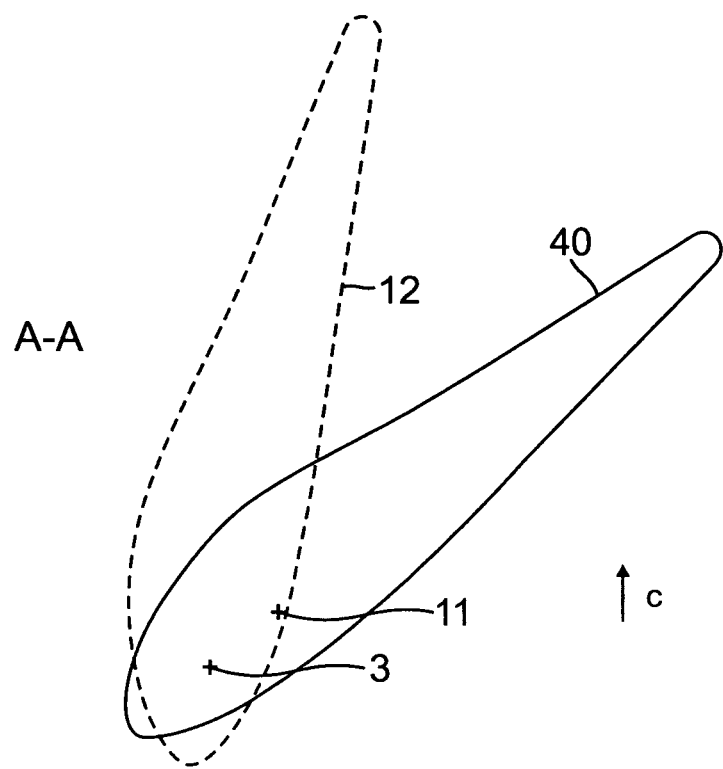
FIG. 3 illustrates the upward swiveling of a rotor blade in the direction of the feathered pitch position.

The swivel axis 3 is chosen in such a way according to the invention that the hydrodynamic forces generate a moment which is directed in the direction of the feathered pitch position. For this purpose, the swivel axis 3 is arranged upstream in a displaced manner, spaced from the hydrodynamic center. As a result of the thus resulting lever, the transversal force $F_q$ generates a moment which is directed in a counter-clockwise direction for the present illustration. This moment acts in an upwardly swiveling manner and tries to twist the profile to the feathered pitch position, which means that the angle between profile chord 9 and the rotational plane 39 is increased in order to reduce the angle of attack of profile 40 in relation to the effective inflow w. A profile 40 in the initial position and, in broken lines, for the upwardly swiveled position 12 in the direction of the feathered pitch position is outlined for a predetermined driving flow c in FIG. 3.

Figure 4:
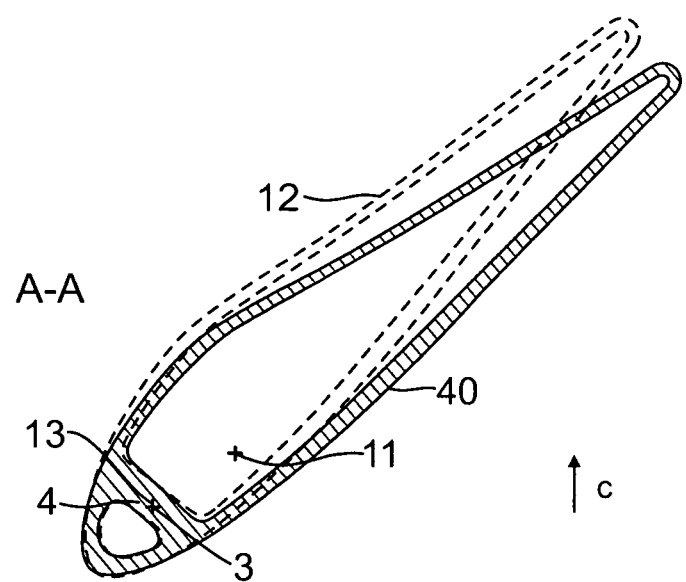
FIG. 4 shows the elastic torsion of a rotor blade in the direction of the feathered pitch position.

For an alternative embodiment of the invention, the rotor blade 1 is linked in a non-rotatable way to the revolving unit 2. Instead, the upward swiveling is caused by an elastic behavior of the rotor blade 1. This is shown in FIG. 4. The position of a reinforcement 4 for a rotor blade 1 which is arranged as a hollow profile is chosen in such a way that the region of increased structure strength is disposed upstream in relation to the hydrodynamic center 11. As a result of this measure, the transversal force $F_q$ leads to a twisting about a torsion axis 13 which will be designated below, in accordance with the terminology as already chosen above, as swivel axis 3, with such axis extending along the reinforcement 4 for the illustrated embodiment. A limited twisting of the rotor blade 1 about the swivel axis 3 is obtained for the profile 40 associated with the section A-A, as indicated in FIG. 4, so that the profile 40 is guided only from a specific radial distance by the revolving unit 2 to the region of the feathered pitch position. There is a possibility to adjust the characteristics for upward swiveling and the moment necessary for this purpose by adjusting the reinforcement 4 and the resulting local determination of the elastic counter-forces against torsion.

Furthermore, the two measures as described above concerning the twisting about the swivel axis 3 by a rotatable linkage of the rotor blade 1 to the revolving unit 2 and torsion about a swivel axis 3 arranged upstream in relation to the hydrodynamic center 11 can be combined with each other.

In contrast to the upwardly swiveling moments as a result of the hydrodynamic force action on the profile 40 of the rotor blades 1 as described above, the centrifugal forces originating during the rotation act upon the rotor blade 1. They tend to guide the rotor blade 1 back to the rotational plane 39, so that a balance of moments is obtained for a predetermined inflow speed on the rotor blade 1. Such a configuration can be chosen by profile configuration and determination of position of the swivel axis 3 in conjunction with speed guidance caused by the directly coupled electric generator that the equilibrium position lies in the range of the feathered pitch position only in the case of an extreme load the rotor blade 1 assumes for normal operation an angle which is beneficial for propulsion in relation to effective inflow w.

Figure 5:
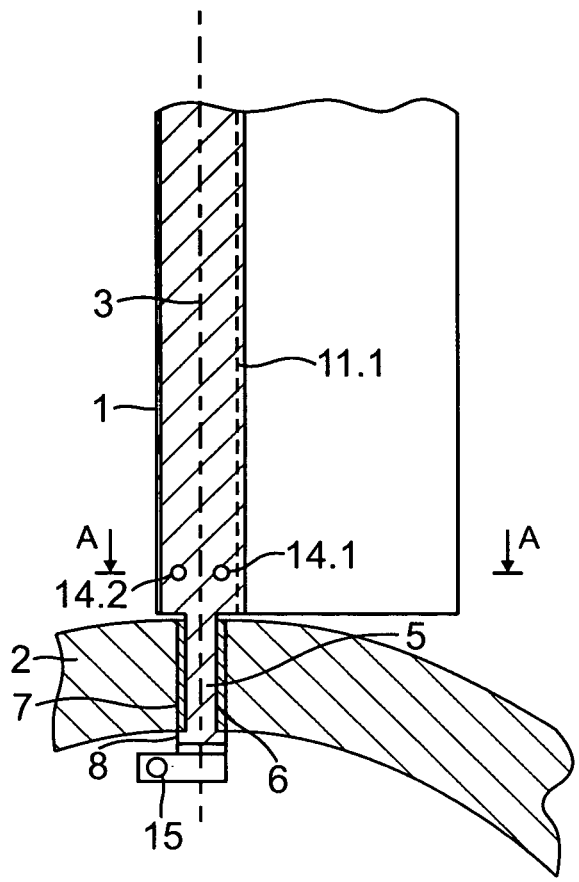
FIG. 5 shows a further development of the embodiment according to FIG. 1 with additional weights and a device generating a restoring force.
Figure 6:
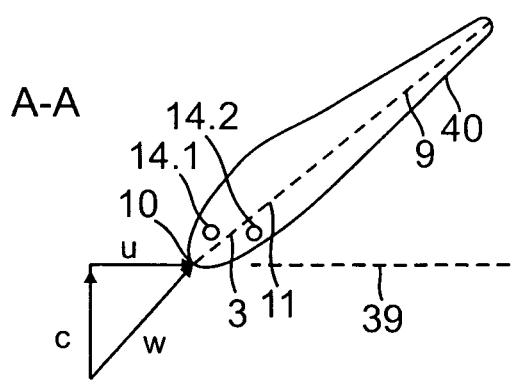
FIG. 6 shows the embodiment according to FIG. 5 in a cross-sectional view.

The resulting equilibrium position can be influenced by further measures. Additional weights 14.1, 14.2 which are arranged in pairs are provided for this purpose in the further development of the embodiment according to FIG. 1 which is shown in FIG. 5. The cross-sectional view of FIG. 6 shows that the additional weights 14.1, 14.2 are spaced from the swivel axis 3 parallel to the rotational plane 39. This increases the surface centrifugal moment of rotor blade 1, so that the returning moments which guide the rotor blade 1 to the position of attack against the feathered pitch position are increased during the rotation. A device for generating a restoring force 15 can be provided in addition or alternatively. In FIG. 5, an apparatus is shown which is integrated for this purpose in the revolving unit 2 and which acts upon an extension about the axial pin 5. Passive systems are especially preferred which generate a counter-force during a rotational movement of the rotor blade 1 in the direction of the feathered pitch position. Spring arrangements are suitable for this purpose.

Furthermore, the measures as shown in FIGS. 5 and 6 improve the start-up of an underwater power plant with passive rotor blade adjustment in accordance with the invention. It is assumed that the rotor blades 1 are in the feathered pitch position and there is no overloading with respect to inflow. In the case that no device for generating a restoring force 15 has been provided, it is necessary to bring the water turbine at first to a specific revolving speed. This is achieved by a motive operation of the electric generator. From a specific revolving speed, the centrifugal forces will guide the rotor blade 1 to the rotational plane 39, so that for normal operation the propulsion during generator operation of the electric generator as produced by the individual rotor blades 1 will make the water turbine revolve with such a speed that the centrifugal forces will hold the rotor blades against the upwardly swiveling hydrodynamic moments in the position of attack up to a predetermined speed of the driving flow c.

FIGS. 7 to 14 concern an embodiment of a passive rotor blade adjustment for a generic underwater power plant with a profile 16 with bidirectional inflow. Such a one is shown in a schematically simplified way in FIGS. 7 and 8, with a lens-shaped profile being assumed which is arranged symmetrically in relation to profile chord 9 and the central line 34. The profile can perform an S-twist alternatively. In this case, the skeleton line is symmetric to point and follows an S-shaped contour. Such a profile arrangement is not shown in detail in the drawings.

Figure 7:
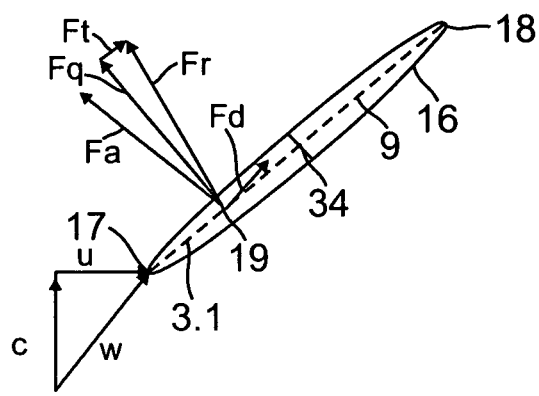
FIGS. 7, 8 show the hydrodynamic forces for inflow from different directions for a bidirectional profile.
Figure 8:
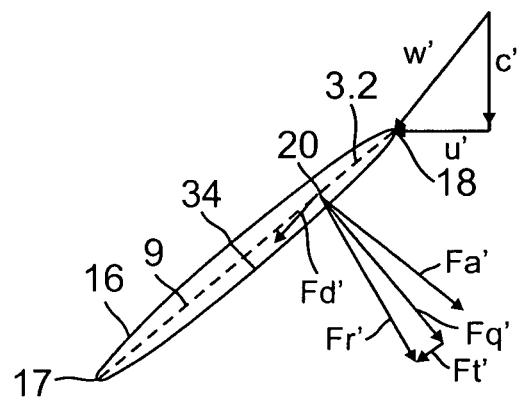

FIG. 7 further shows in an exemplary profile sectional view the driving flow c from a first direction, the negative revolving speed u and the effective inflow w, with the resulting hydrodynamic force $F_r$ being generated which acts upon the first hydrodynamic center 19. The resulting hydrodynamic force $F_r'$ is obtained for a second opposite direction of inflow with the driving flow c' which is shown in FIG. 8, which force acts upon the symmetrically disposed, second hydrodynamic center 20. In order to realize a passive rotor blade adjustment, the swivel axis must be arranged upstream of the hydrodynamic center in order to provide a lever arm for generating an upwardly swiveling moment in relation to the transversal force $F_q$, $F_q'$. There is a necessity, depending on the inflow direction, of performing a change from a first swivel axis 3.1 to a second swivel axis 3.2. Active systems can be used for this purpose, but this would lead to an undesirable effort in regard to control systems. It is therefore preferable to also perform the transition from the first swivel axis 3.1 to the second swivel axis 3.2 in a passive way depending on the inflow direction, so that the change can be caused exclusively by the flow forces themselves.

The breakdown of the resulting hydrodynamic force $F_r$, $F_r'$ into a transversal force $F_q$, $F_q'$ which is perpendicular to the profile chord 9 and a tangential force $F_t$, $F_t'$ which is parallel to the profile chord 9 as chosen in FIGS. 7 and 8 leads to a tangential force $F_t$, $F_t'$ for the illustrated embodiment which faces from the profile nose on the inflow side to the profile nose on the outflow side. This direction can be set by choosing the profile and its installation angle for a predetermined inflow speed range by determining the ratio between the buoyancy and the flow resistance in the profile. The following embodiment of a passive rotor blade adjustment for a profile 16 with bidirectional inflow assumes such a chosen direction for the tangential force $F_t$, $F_t'$. However, the illustrated principle can also be applied to an oppositely directed tangential force $F_t$, $F_t'$.

Figure 9:
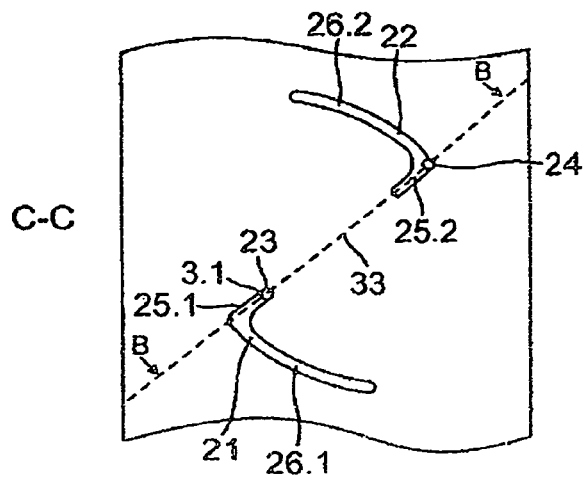
FIG. 9 shows a cross-sectional view of the guide grooves of a rotor blade adjustment device in accordance with the invention for a bidirectional rotor blade profile.
Figure 10:
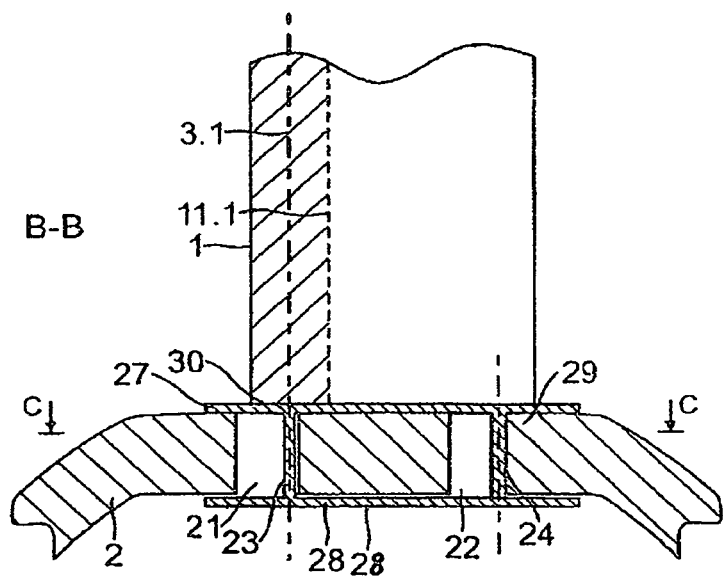
FIG. 10 shows the sectional view B-B of FIG. 9.

FIGS. 9 and 10 show a possible embodiment of a passive rotor blade adjustment for a rotor blade 1 with a bidirectional profile. A planar guide region 29 is provided for this purpose in the revolving unit 2, on which a sliding apparatus 30 which is rigidly connected with the rotor blade 1 performs a guided sliding motion and simultaneously transmits rotor blade forces. For the present arrangement, the sliding apparatus 30 comprises an upper support plate 27 and a bottom support plate 28 which are applied in a plane-parallel manner and are chosen with respect to their distance in such a way that sliding on the upper and lower side of the same occurs during a relative motion to the planar guide region 29. The acting running surfaces of these components are advantageously covered with a sliding material such as PTFE for example or are arranged as slide bearings. In this case, one component is preferably made of a hard material, typically special steel, and the counter-running surface is made of a soft material such as an elastomer, especially Orkot®.

The connection between the upper support plate 27 and the bottom support plate 28 occurs by a first coupling element 23 and a second coupling element 24 with a preferably cylindrical shape. The coupling elements 23, 24 are arranged with respect to the bidirectional profile of the rotor blade 1 in such a way that their longitudinal axes define the first and second swivel axis 3.1, 3.2. The first coupling element 23 moves in a first guide groove 21 which reaches through the planar guide region 29. Accordingly, a second guide groove 22 is associated with the second coupling element 24.

The effectiveness of one each of the two swivel axes 3.1, 3.2 is determined by the moving capabilities of the coupling elements 23, 24 in the associated-guide grooves 21, 22. This is shown from the sectional view C-C as shown in FIG. 9. The two guide grooves 21, 22 are arranged in a mirror-like manner with respect to one another and each comprise a short leg which extends at least in the end regions parallel to the profile chord 9 of the rotor blade 1 in the normal operating position. The short legs shall be designated below as tangential guides 25.1, 25.2. They can be associated with a coinciding longitudinal axis of the tangential guides 33. Furthermore, upward swiveling regions 26.1 and 26.2 are provided for the guide grooves 21, 22, which regions are adjacent to the tangential guides 25.1, 25.2. Preferably, the sliding surface of an upward swiveling region 26.1, 26.2 for the respectively associated coupling segment 23, 24 substantially follows the arc of a circle whose central point lies in the end region of the tangential guide 25.1, 25.2 of the opposite guide groove 21, 22 for the non-associated coupling element 23, 24. The radius of the arc of the circle corresponds substantially to the distance of the central points of the two coupling elements 23, 24.

Figure 11:
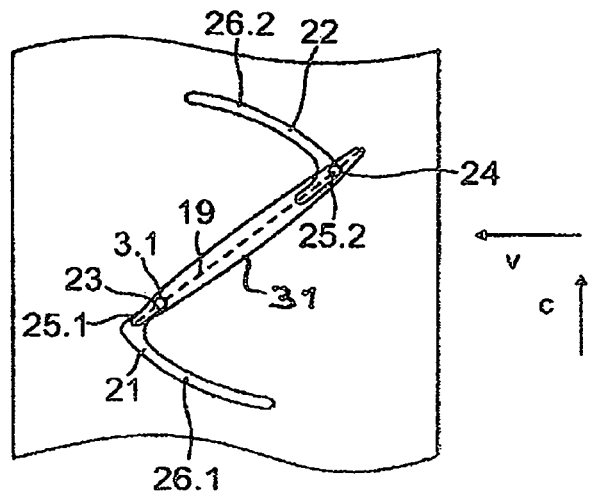
FIG. 11 shows the normal operating state for an inflow from a first direction for the sectional view of FIG. 9 with a superimposed rotor blade profile.
Figure 12:
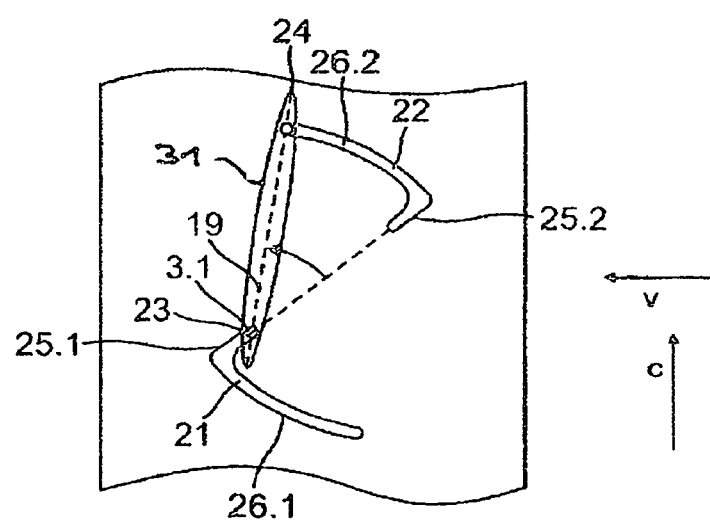
FIG. 12 shows the overload state with a rotor blade upwardly swiveled to the feathered pitch position for the sectional view of FIG. 9 with a superimposed rotor blade profile.

The function of the guide grooves 21, 22 is shown in the FIGS. 11 to 14. The drawings show the projection of the profile 31 with bidirectional inflow to the sectional view of FIG. 9 for different operating situations. FIG. 11 shows the revolving speed v for normal operation for a driving flow. The first coupling element 23 is positioned in the end region of the first tangential guide 25.1 and the second coupling element 24 is disposed in the second guide groove 22 in such a way that an upwardly swiveling motion along the second upward swiveling region 26.2 is possible. Consequently, the first swivel axis 3.1 is determined by the first coupling element 23. Furthermore, the hydrodynamic forces are taken up through the walls of the first guide groove 21. In addition, the preferably planar arrangement of the upper and bottom support plates 27, 28 act in a load-absorbing way. Based on this normal operating state, the upward swiveling of the rotor blade 1 occurs in the case of overloading. This is shown in FIG. 12.

Figure 13:
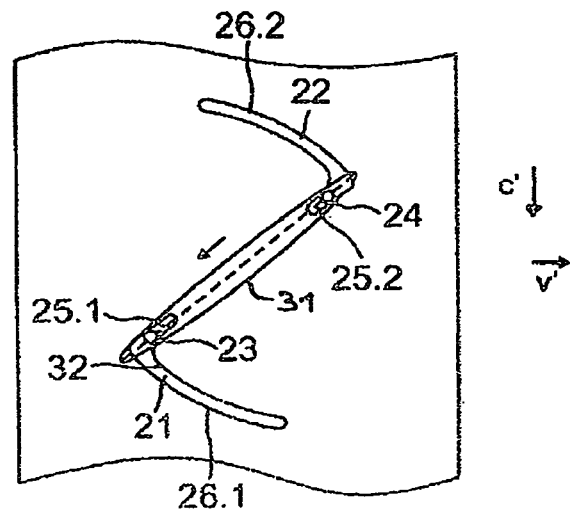
FIGS. 13 and 14 show the change of the swivel axis as a consequence of a reversal of the inflow direction for the sectional view of FIG. 9 with a superimposed rotor blade profile.
Figure 14:
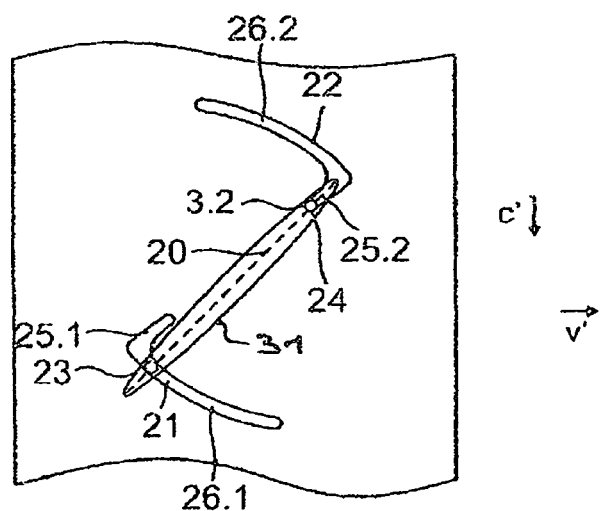
Figure 15:
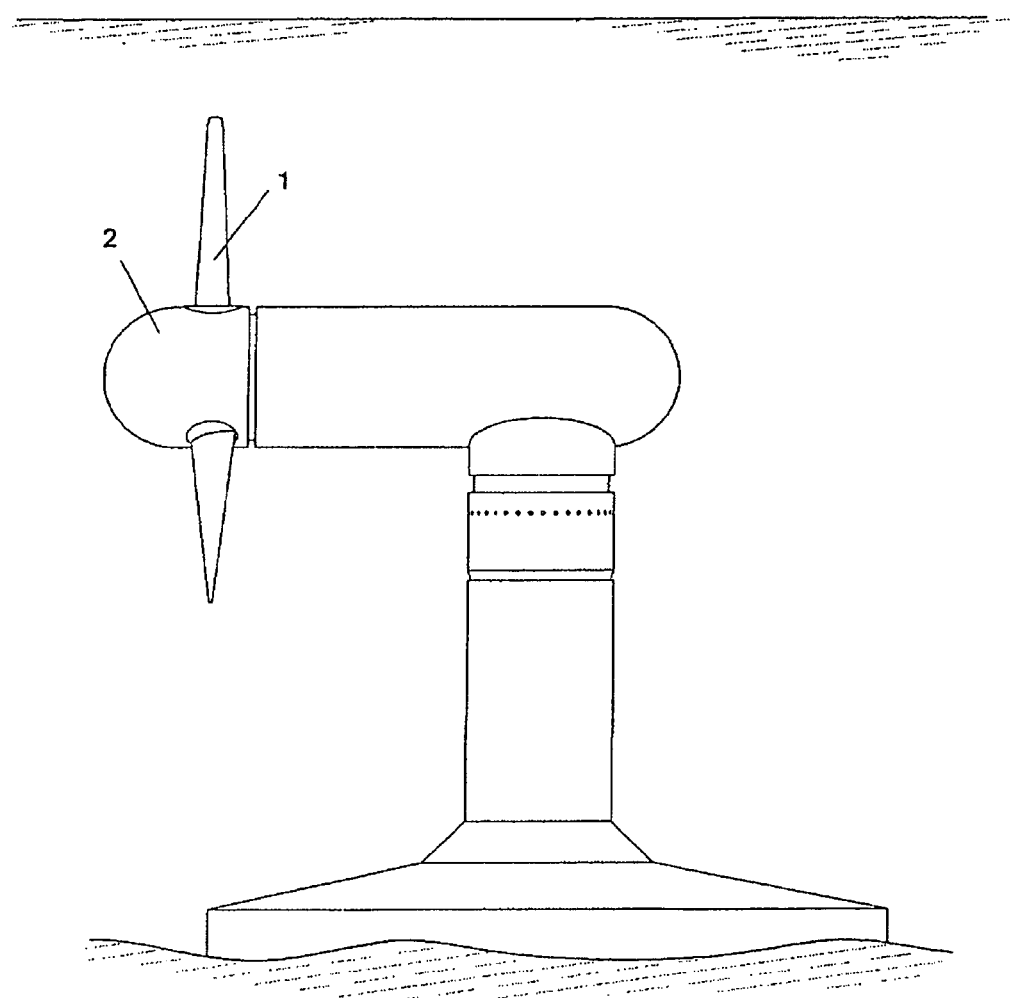
FIG. 15 shows a free standing tidal power plant without a dam structure with a revolving unit 2 comprising a rotor blade 1.

When there is a change of the direction of the driving flow c', the change as shown in FIGS. 13 and 14 occurs from the first swivel axis 3.1 to the second swivel axis 3.2. The flow pressure on the rotor blade 1 and the gradually building tangential force $F_t$ lead to a sliding motion of the coupling elements 23, 24 in the tangential guides 25.1, 25.2. In the further course of this movement, the first coupling element 23 follows the curved sliding path 32 on the inside of the first guide groove 21 and the second coupling element 24 is moved up to the end region of the second tangential guide 25.2. As a result, the second swivel axis 3.2 is determined by the second coupling element 24. As a result of a subsequent increase in the revolving speed v, there is an equilibrium of moments which leads to a parallel alignment of the profile chord 9 relative to the axis of the tangential guides 33. This position which is mirror-like to FIG. 9 is not shown in detail in the drawings.

Further embodiments of the invention are possible. It is especially possible that the swivel axis has a curved progression, especially in the case of sickle-shaped rotor blades. The same applies to the case of a swivel axis 3 with a twisting of the rotor blade as a result of hydrodynamic forces when the reinforcing components which determine the swivel axis 3 do not extend in a straight line. A swivel axis which does not extend in a straight line represents a possible embodiment of the invention. Furthermore, an underwater power plant which is arranged in accordance with the invention can have a growth protection system, especially in the region of the rotor blade adjustment device. Such a system may comprise devices for heating parts of the plant in order to remove growth and to especially keep the guide paths and the running elements of the rotor blade adjustment in a functional state. Further embodiments of the invention are obtained from the scope of the following claims.

LIST OF REFERENCE NUMERALS

1 Rotor blade
2 Revolving unit
3 Swivel axis
3.1 First swivel axis
3.2 Second swivel axis
4 Reinforcement
5 Axial pin
6 Receptacle
7 Bearing
8 Radial securing means
9 Profile chord
10 Profile nose
11 Hydrodynamic center
11.1 Threading line of hydrodynamic centers
12 Upwardly swiveled position
13 Torsion axis
14 Additional weight
15 Device generating restoring force
16 Profile with bidirectional inflow
17 First profile nose
18 Second profile nose
19 First hydrodynamic center
20 Second hydrodynamic center
21 First guide groove
22 Second guide groove
23 First coupling element
24 Second coupling element
25.1 First tangential guide
25.2 Second tangential guide
26.1 First upward swiveling region
26.2 Second upward swiveling region
27 Upper support plate
28 Bottom support plate
29 Planar guide region
30 Sliding apparatus
31 Projection of the bidirection inflow profile
32 Curved sliding path
33 Longitudinal axes of tangential guides
34 Central line
39 Rotational plane
40 Profile
c, c' Driving flow
d Angle of attack
u, u' Negative revolving speed
v, v' Revolving speed
w, w' Effective inflow
$F_a$, $F_a'$ Buoyancy $F_d$, $F_d'$ Flow resistance
$F_r$, $R_r'$ Resulting hydrodynamic force
$F_q$, $F_q'$ Transversal force
$F_t$, $F_t'$ Tangential force

The invention claimed is:

1. A free standing tidal power plant without a dam structure, wherein the tidal power plant is set to take up kinetic energy from a water flow, the tidal power plant comprising:
   a propeller-shaped water turbine in horizontal rotor configuration with rotor blades, the rotor blades having bidirectional profiles, wherein the rotor blades are fastened to a revolving unit, which defines a rotational plane; and
   an electric generator at least indirectly driven by the water turbine;
   wherein each rotor blade is associated with a first swivel axis and a second swivel axis, the first axis and the second swivel axis extending substantially along a longitudinal axes of a first coupling element and a second coupling element, respectively;
   wherein the revolving unit includes a planar guide region having a sliding apparatus, the planar guide region having a first guide groove and a second guide groove, the sliding apparatus connected to the rotor blade to transmit rotor blade forces;
   wherein the first coupling element moves in the first guide groove and the second coupling element moves in the second guide groove;
   wherein the rotor blade transitions from the first swivel axis to the second swivel axis passively from flow forces in response to a change in flow direction.

2. The tidal power plant according to claim 1, wherein the rotor blade comprises additional weights, the weights arranged with a distance to the swivel axis with respect to a direction parallel to the rotational plane for the operational position of the rotor blade.

3. The tidal power plant according to claim 1, wherein the first and the second guide groove are arranged to mirror one another.

4. The tidal power plant according to claim 1, wherein the first guide groove and the second guide groove each comprises a short leg which extends at least in the end regions parallel to a profile chord of the rotor blade in normal operating position.

5. The tidal power plant of according to claim 4, wherein the first guide groove and the second guide groove each comprises a long leg which substantially follows the arc of a circle whose end point lies in an end region of the short leg.

6. The tidal power plant according to claim 5, wherein in response to the change in the flow direction the first coupling element and the second coupling element slide in the short leg of each of the first guide groove and the second guide groove.

7. The tidal power plant according to claim 1, wherein the sliding apparatus comprises an upper support plate and a bottom support plate, wherein the upper support plate and the bottom support plate are connected by the first coupling element and the second coupling element.

8. The tidal power plant according to claim 1, wherein the rotor blade in a feathered pitch position is not self-starting and the rotor blade is set such that the electric generator in a motive operation accelerates the rotor blade above a specific revolving speed for which the rotor blade is self-propelling.

* * * * *